(12) United States Patent
Murrow et al.

(10) Patent No.: US 7,726,115 B2
(45) Date of Patent: Jun. 1, 2010

(54) AXIAL FLOW POSITIVE DISPLACEMENT WORM COMPRESSOR

(75) Inventors: Kurt David Murrow, West Chester, OH (US); Rollin George Giffin, Cincinnati, OH (US); Oladapo Fakunle, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 934 days.

(21) Appl. No.: 11/345,760

(22) Filed: Feb. 2, 2006

(65) Prior Publication Data
US 2007/0175202 A1    Aug. 2, 2007

(51) Int. Cl.
*F02C 3/055*    (2006.01)
(52) U.S. Cl. ........................... 60/39.45; 418/48
(58) Field of Classification Search ................ 60/39.45; 123/241, 249; 418/48, 51
See application file for complete search history.

(56) References Cited

U.S. PATENT DOCUMENTS

| | | | |
|---|---|---|---|
| 1,892,217 A | 12/1932 | Moineau | |
| 2,553,548 A | 5/1951 | Canazzi et al. | |
| 2,615,436 A * | 10/1952 | Pawl | 123/241 |
| 3,938,915 A | 2/1976 | Olofsson | |
| 4,144,001 A | 3/1979 | Streicher | |
| 4,179,250 A | 12/1979 | Patel | |
| RE30,400 E | 9/1980 | Zimmern | |
| 4,482,305 A | 11/1984 | Natkai et al. | |
| 4,500,259 A | 2/1985 | Schumacher | |
| 4,802,827 A | 2/1989 | Fujiwara et al. | |
| 4,818,197 A | 4/1989 | Mueller | |
| 4,863,357 A | 9/1989 | Olofsson | |
| 5,017,087 A | 5/1991 | Sneddon | |
| 5,195,882 A | 3/1993 | Freeman | |

(Continued)

FOREIGN PATENT DOCUMENTS

EP    302 877 B1    12/1991

(Continued)

OTHER PUBLICATIONS

"Quindos—Screw Compressor", Measurement of Screw Rotors on Leitz Coordinate Measuring Machines, Leitz, M41-155-QNT-001, www.leitz-metrology.com, 1 page.

(Continued)

*Primary Examiner*—Louis J Casaregola
(74) *Attorney, Agent, or Firm*—William Scott Andes; Steven J. Rosen (57) ABSTRACT

An axial flow positive displacement compressor has an inlet axially spaced apart and upstream from an outlet. Inner and outer bodies have offset inner and outer axes extend from the inlet to the outlet through first and second sections of a compressor assembly in serial downstream flow relationship. At least one of the bodies is rotatable about its axis. The inner and outer bodies have intermeshed inner and outer helical blades wound about the inner and outer axes respectively. The inner and outer helical blades extend radially outwardly and inwardly respectively. The helical blades have first and second twist slopes in the first and second sections respectively. The first twist slopes are less than the second twist slopes. An engine including the compressor has in downstream serial flow relationship from the compressor a combustor and a high pressure turbine drivingly connected to the compressor by a high pressure shaft.

51 Claims, 9 Drawing Sheets

U.S. PATENT DOCUMENTS

| | | | |
|---|---|---|---|
| 5,605,124 A | 2/1997 | Morgan | |
| 5,692,372 A | 12/1997 | Whurr | |
| 5,960,711 A | 10/1999 | Nordin | |
| 6,155,807 A | 12/2000 | Fenton | |
| 6,217,304 B1 | 4/2001 | Shaw | |
| 6,332,271 B1 | 12/2001 | Hampel | |
| 6,651,433 B1 | 11/2003 | George, Jr. | |
| 6,705,849 B2 | 3/2004 | Zhong et al. | |
| 6,905,319 B2 | 6/2005 | Guo | |
| 2004/0005235 A1 | 1/2004 | Didin | |
| 2004/0208740 A1* | 10/2004 | Hubbard | 415/72 |
| 2005/0089414 A1 | 4/2005 | Ohman | |
| 2005/0169789 A1 | 8/2005 | Okada | |
| 2005/0223734 A1 | 10/2005 | Smith et al. | |
| 2005/0226758 A1 | 10/2005 | Hossner | |
| 2007/0137173 A1* | 6/2007 | Murrow et al. | 60/226.1 |
| 2007/0137174 A1* | 6/2007 | Murrow et al. | 60/226.1 |

FOREIGN PATENT DOCUMENTS

| | | |
|---|---|---|
| EP | 627 041 B1 | 9/1999 |
| EP | 805 743 B1 | 4/2000 |
| EP | 1 132 618 A2 | 9/2001 |
| EP | 1 500 819 A2 | 1/2005 |
| FR | 787711 | 9/1935 |
| GB | 427475 | 4/1935 |
| SE | 89284 | 5/1937 |
| SU | 1567804 | 5/1990 |
| WO | WO9747886 | 12/1997 |

OTHER PUBLICATIONS

"CASHFLO for Compressed Air", The History Of Screw Compressors, Cashflo Limited, Test, Oct. 29, 2005, http://www.cashflo.co.uk/Screw.html, 2 pages.

"SITIS Archives—Topic Details", Archives Topic List, SBIR/STTR Interactive Topic Information System (SITIS), http://www.dodsbir.net/sitis/archives_display_topic.asp?Bookmark=27896, Oct. 27, 2005, 3 pages.

Prospects For Energy Conversion Efficiency Improvements By The Use Of Twin Screw Two-Phase Expanders, I K Smith, and N Stosic, Centre for Positive Displacement Compressor Technology, School of Engineering, City University, London, EC1V 0HB, U.K., 8 pages.

EP06255326, European Search Report, European Patent Office, Mar. 26, 2007.

* cited by examiner

AXIAL FLOW POSITIVE DISPLACEMENT WORM COMPRESSOR

The Government has rights to this invention pursuant to Contract No. NAS3-01135 awarded by the NASA.

BACKGROUND OF THE INVENTION

Field of the Invention

The present invention relates generally to continuous axial flow compressors and, more particularly, to axial flow positive displacement compressors and worm and screw compressors.

Compressors are widely used in many applications such as in gas generators in gas turbine engines. Continuous axial flow compressors are utilized in a wide range of applications owing to a combination of desirable attributes such as high mass flow rate for a given frontal area, continuous near steady fluid flow, reasonable adiabatic efficiency, and the ability to operate free from aerodynamic stall and aeromechanical instability over a wide range of conditions. It is a goal of compressor and gas turbine manufacturers to have lightweight, compact, and highly efficient axial flow compressors. It is another goal to have as few parts as possible in the compressor to reduce the costs of manufacturing, installing, refurbishing, overhauling, and replacing the compressor. Therefore, it is desirable to have a compressor that improves on all of these characteristics.

BRIEF DESCRIPTION OF THE INVENTION

A continuous axial flow positive displacement compressor also referred to as a worm compressor includes an inlet axially spaced apart and upstream from an outlet. The worm compressor includes a compressor assembly including inner and outer bodies extending from the inlet to the outlet. The inner and outer bodies have offset inner and outer axes, respectively. The compressor assembly has first and second sections in serial downstream flow relationship. Either or both bodies may be rotatable. In one embodiment of the compressor, the inner body is rotatable about the inner axis within the outer body. The outer body may be rotatably fixed or rotatable about the outer axis. The inner and outer bodies have intermeshed inner and outer helical blades wound about inner and outer axes, respectively. The inner and outer helical blades extend radially outwardly and inwardly, respectively.

The helical blades have first and second twist slopes in the first and second sections of the compressor assembly, respectively. A twist slope is defined as the amount of rotation of a cross-section of the helical element per unit distance along an axis. The first twist slopes are less than the second twist slopes. The helical blades in the first section have a sufficient number of turns to trap charges of gas in the first section during the compressor's operation. In one embodiment of the compressor, the number of turns is sufficient to mechanically trap the charges of gas. In another embodiment of the compressor, the number of turns is sufficient to dynamically trap the charges of gas. The helical blades in the second section have a sufficient number of turns to ensure that the leading edge of the charge is not exposed to the conditions downstream of the compressor until the trailing edge of the charge has crossed the compression plane, thereby completing the compression process.

DETAILED DESCRIPTION OF THE INVENTION

Figure 1:
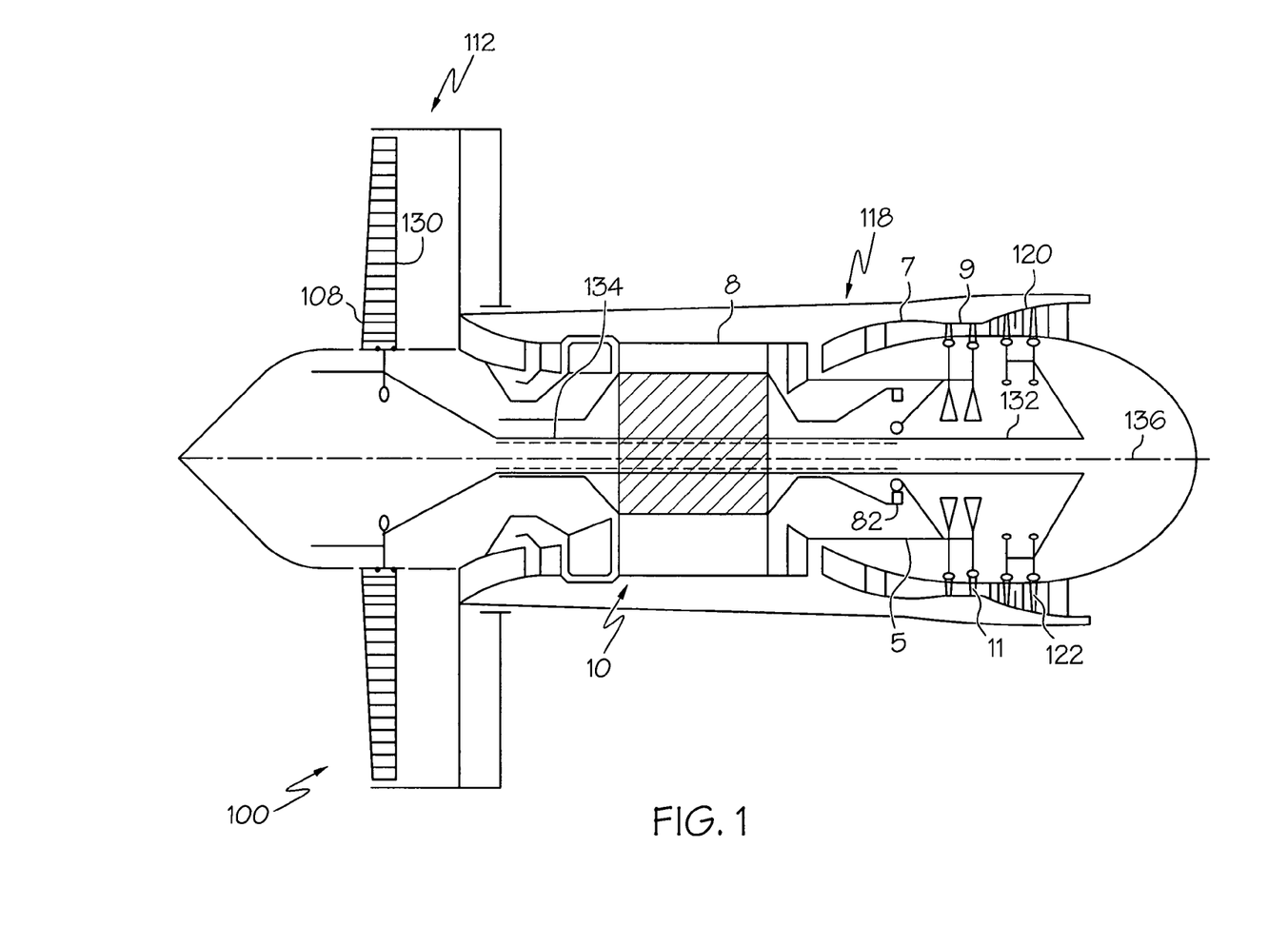
FIG. 1 is a cross-sectional view illustration of an exemplary aircraft gas turbine engine with a positive displacement continuous axial flow compressor.

Illustrated in FIG. 1 is an exemplary embodiment of a continuous axial flow positive displacement compressor also referred to as a worm compressor 8 in a gas turbine engine 100. The worm compressor 8 is part of a gas generator 10 used to power a low pressure turbine that produces work to drive a fan 108 in a fan section of the engine 100. The gas generator 10 may be used to directly drive power consuming devices such as marine propulsion drives and electrical power generators or aircraft nozzles or fans. The exemplary embodiment of the gas turbine engine 100 illustrated in FIG. 1 is an aircraft gas turbine engine having a core engine 118 including the worm compressor 8 and gas generator 10 downstream of the fan section 112.

The core engine 118 includes in downstream serial flow relationship the worm compressor 8, a combustor 7, and a high pressure turbine 9 (HPT) having high pressure turbine blades 11 drivingly connected to the worm compressor 8 by a high pressure shaft 5. Combustion gases are discharged from the core engine 118 into a low pressure turbine (LPT) 120 having low pressure turbine rotor blades 122. The low pressure turbine rotor blades 122 are drivingly attached to a row of circumferentially spaced apart fan rotor blades 130 of the fan 108 in the fan section 112 by a low pressure shaft 132 to form a low pressure spool 134 circumscribing an engine centerline 136. The worm compressor 8 may be used in other applications including, but not limited to, ground based industrial and marine gas turbine engines.

Referring to FIGS. 2-5, the worm compressor 8 includes a compressor assembly 15 having inner and outer bodies 12, 14 extending from an inlet 20 to an outlet 22. The inner body 12 is disposed within a cavity 19 of the outer body 14. The inner and outer bodies 12, 14 have inner and outer axes 16, 18, respectively. The compressor assembly 15 has first and second sections 24, 26 in serial downstream flow relationship. The compressor assembly 15 provides continuous flow through the inlet 20 and the outlet 22 during operation of the worm compressor 8. Individual charges of gas 50 are captured in and by the first section 24. Compression of the charges 50 occurs as the charges 50 pass from the first section 24 to the second section 26. Thus, an entire charge 50 undergoes compression while it is in both the first and second sections 24 and 26, respectively.

Either or both bodies may be rotatable and, if both bodies are rotatable, they rotate in the same circumferential direction, i.e. either clockwise or counterclockwise, but at different rotational speeds determined by a fixed relationship. If only one body is rotatable, then the other body is fixed. In one embodiment of the generator, the inner body 12 is rotatable about the inner axis 16 within the outer body 14 and the outer body 14 may be rotatably fixed or rotatable about the outer axis 18.

The inner and outer bodies 12, 14 have intermeshed inner and outer helical elements wound about the inner and outer axes 16, 18, respectively. The elements are inner and outer helical blades 17, 27 having inner and outer helical surfaces 21, 23, respectively. The inner helical blades 17 extend radially outwardly from a hollow inner hub 51 of the inner body 12 and the outer helical blades 27 extend radially inwardly from an outer shell 53 of the outer body 14. An inner helical edge 47 along the inner helical blade 17 sealingly engages the outer helical surface 23 of the outer helical blade 27 as they rotate relative to each other. An outer helical edge 48 along the outer helical blade 27 sealingly engages the inner helical surface 21 of the inner helical blade 17 as they rotate relative to each other.

Figure 4:
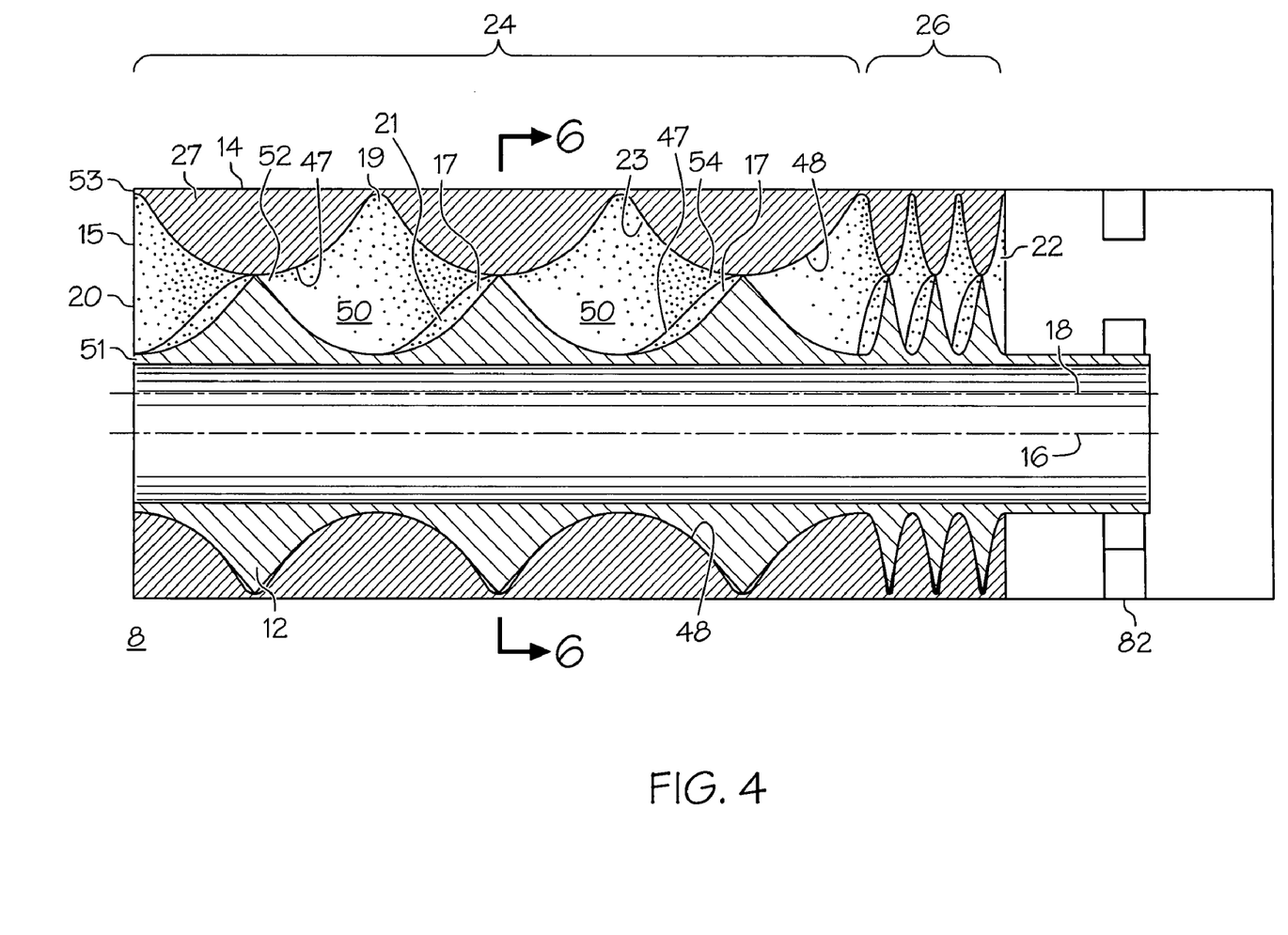
FIG. 4 is a diagrammatic cross-sectional view illustration of gearing between inner and outer bodies of the compressor illustrated in FIG. 3.
Figure 6:
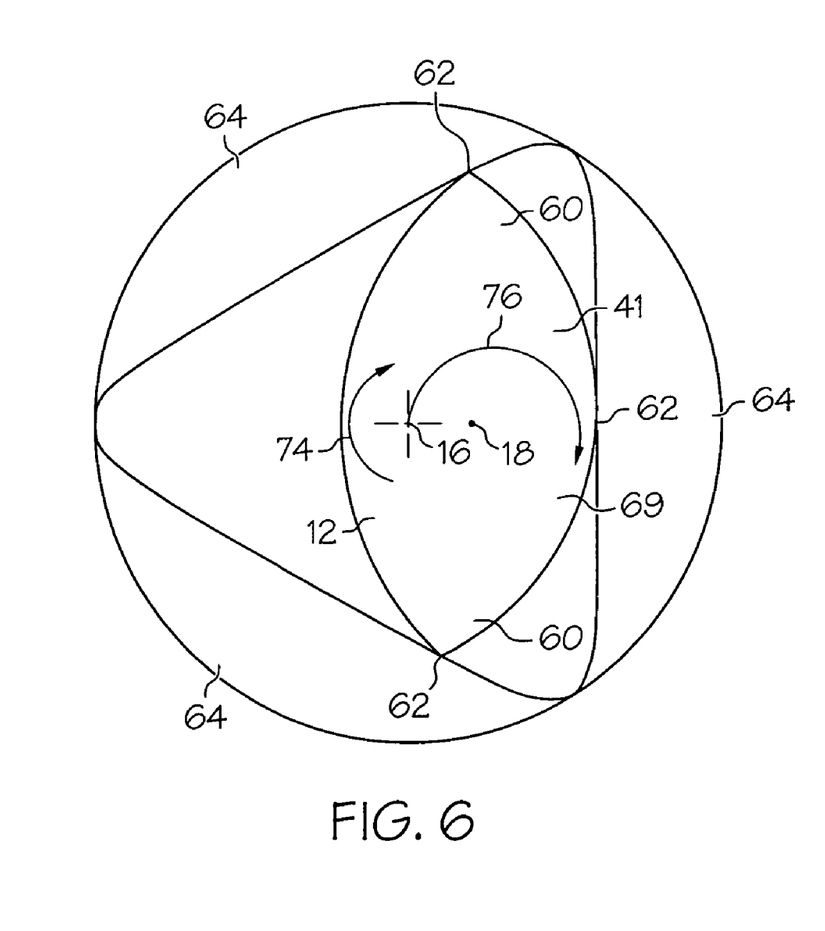
FIG. 6 is a diagrammatic cross-sectional view illustration of the inner and outer bodies taken through 6-6 in FIG. 4.

Illustrated in FIG. 4 is a longitudinal cross-section taken through the inner and outer bodies 12, 14. The inner and outer bodies 12, 14 are illustrated in axial cross-section in FIG. 6. The inner body 12 is illustrated herein as having two inner body lobes 60 which correspond to two inner helical blades 17 that form a football or pointed oval-shaped inner body cross-section 69. The outer body 14 has three outer body lobes 64 which correspond to three outer helical blades 27 (illustrated in FIGS. 3 and 4). Note that three sealing points 62 between the inner and outer bodies 12, 14 are illustrated in FIG. 6 but that five periodically overlapping seals exist between the inner and outer helical blades 17, 27 along the entire length of the inner and outer bodies 12, 14.

Figure 7:
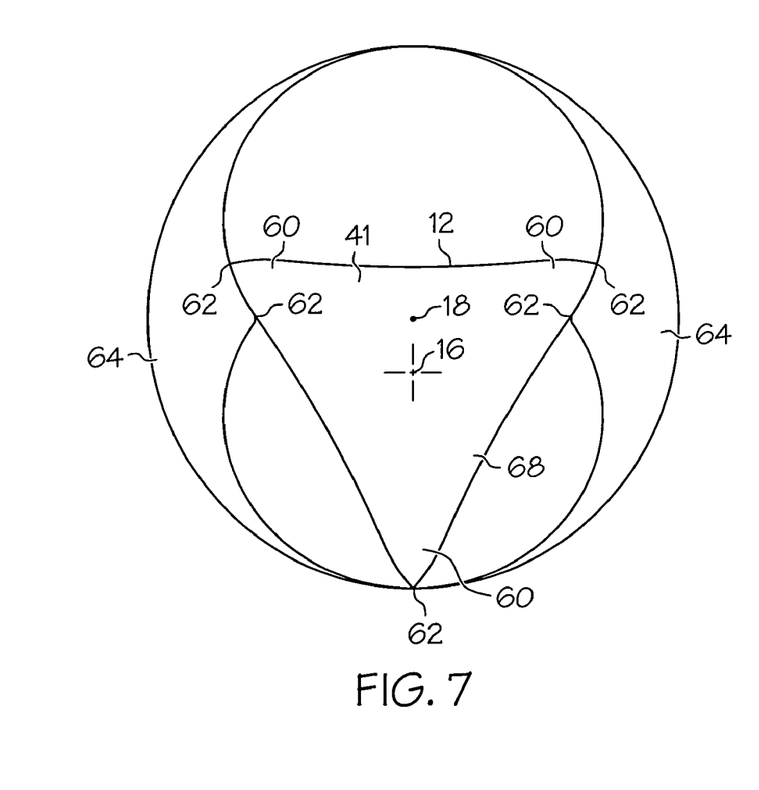
FIGS. 7-10 are diagrammatic cross-sectional view illustrations of an alternate inner and outer body configuration at different relative angular positions.
Figure 8:
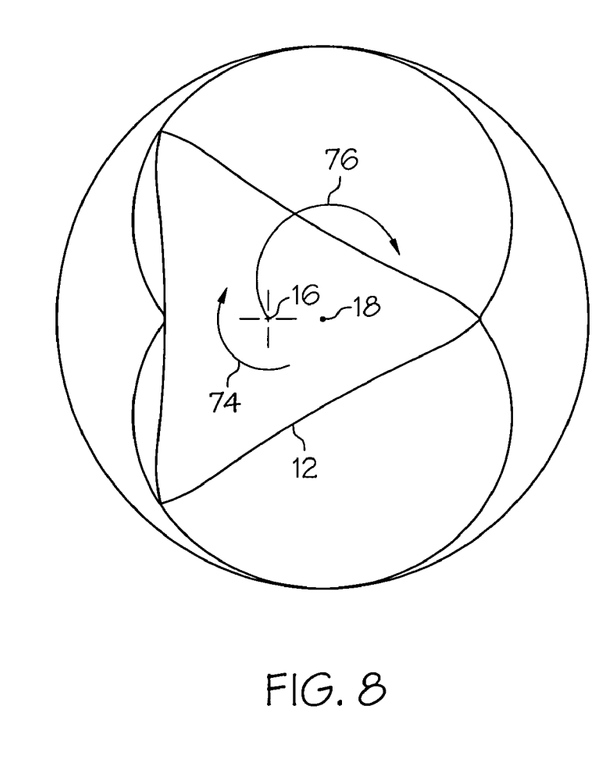
Figure 9:
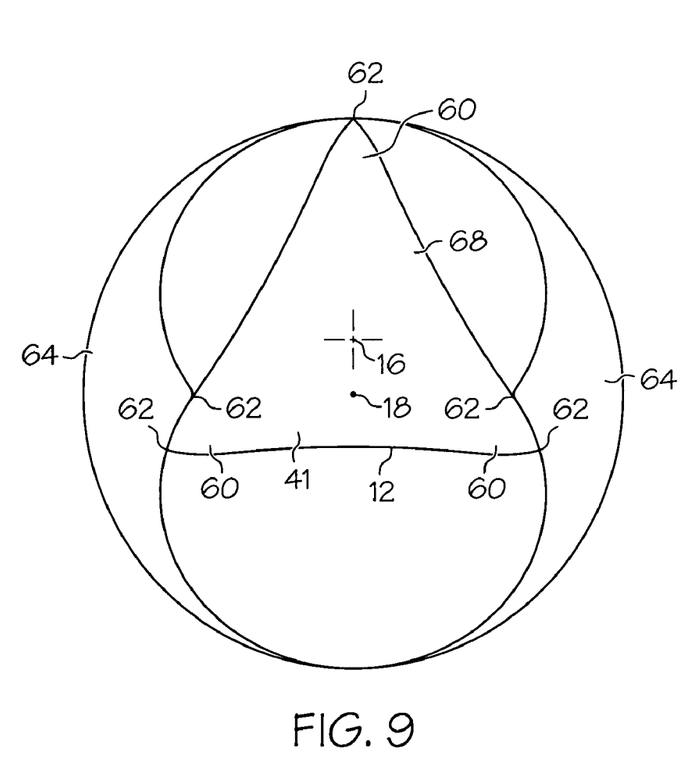
Figure 10:
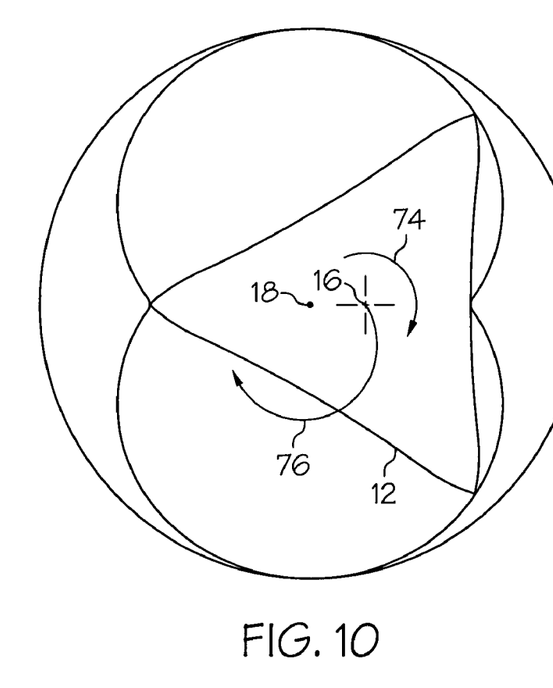

An alternative configuration of the inner and outer bodies 12, 14 is illustrated in cross-section in FIGS. 7-10. The inner body 12 is illustrated therein as having three inner body lobes 60 which correspond to three inner helical blades 17 which result in a triangularly-shaped inner body cross-section 68 as illustrated in FIG. 7. The outer body 14 has two outer body lobes 64 which correspond to two outer helical blades 27. In general, if the inner body 12 has N number of lobes the outer body 14 will have N+1 or N−1 lobes. Note that five sealing points 62 between the inner and outer bodies 12, 14 are illustrated in FIG. 7, corresponding to five periodically overlapping seals between the inner and outer helical blades 17, 27 along the entire length of the inner and outer bodies 12, 14.

Figure 5:
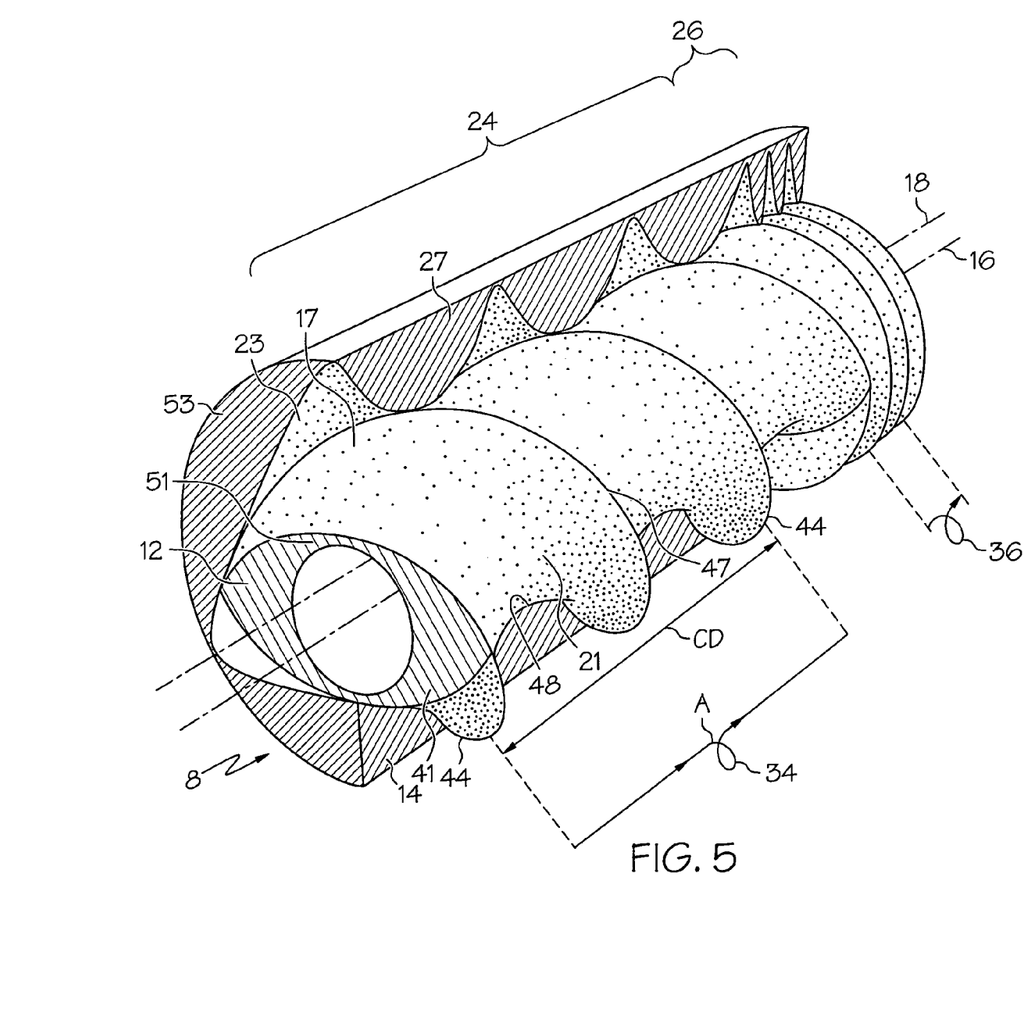
FIG. 5 is a diagrammatic cut-away perspective view illustration of the helical blade portions of the inner and outer bodies of the compressor illustrated in FIG. 3.

Referring to FIG. 5, the inner and outer helical blades 17, 27 have constant first and second twist slopes 34, 36 in the first and second sections 24, 26, respectively. A twist slope A is defined as the amount of rotation of a cross-section 41 of the helical element (such as the oval-shaped or triangularly-shaped inner body cross-sections 69, 68 illustrated in FIGS. 6 and 7, respectively) per distance along an axis such as the inner axis 16 as illustrated in FIG. 5. Illustrated in FIG. 5 is 360 degrees of rotation of the inner body cross-section 41. The twist slope A is also 360 degrees or 2Pi radians divided by an axial distance CD between two successive crests 44 along the same inner or outer helical edges 47, 48 of the helical element such as the inner or outer helical blades 17, 27 as illustrated in FIG. 5. The axial distance CD is the distance required for one full turn 43 of the helix.

The twist slope A of the inner element in each of the sections is different from the twist slope A of the outer element. The ratio of the twist slope A of the outer body 14 to the twist slope A of the inner body 12 is equal to the ratio of the number of inner helical blades 17 blades on the inner body 12 to the number of outer helical blades 27 on the outer body 14. The first twist slopes 34 in the first section 24 are less than the second twist slopes 36 in the second section 26. The helical elements may also be described in terms of helical angle. The helical elements have constant first and second helical angles corresponding to the constant first and second twist slopes 34, 36, in the first and second sections 24, 26, respectively.

Referring again to FIGS. 3-5, the inner helical blade 17 in the first section 24 has a sufficient number of turns 43 to trap the charges of gas 50 in the first section 24 without allowing the compression process to affect the inlet flow field during the compressor's operation. The trapped charges of gas 50 allow positive displacement compression so that higher pressures developed downstream cannot force gas back out the inlet 20. In one embodiment of the gas generator, the number of turns 43 in the first section 24 is sufficient to mechanically trap the charges of gas 50. In another embodiment of the gas generator 10, the number of turns 43 in the first section 24 is sufficient to dynamically trap the charges of gas 50. Mechanically trapped means that the charge 50 is trapped by being closed off from the inlet 20 at an upstream end 52 of the charge 50 before it passes into the second section 26 at a downstream end 54 of the charge 50. Dynamically trapped means that though the downstream end 54 of the trapped charge may have passed into the second section 26, the upstream end 52 of the charge has not yet completely closed. However, at its downstream end 54 by the time a pressure wave from the second section travels to the inlet 20, relative rotation between the bodies will have closed off the charge of gas 50 at its upstream end 52.

For the fixed outer body 14 embodiment, the inner body 12 is cranked relative to the outer axis 18 so that as it rotates about the inner axis 16, the inner axis 16 orbits about the outer axis 18 as illustrated in FIGS. 7-10. The inner body 12 is illustrated as having been rotated about the inner axis 16 from its position in FIG. 7 to its position in FIG. 8 and the inner axis 16 is illustrated as having orbited about the outer axis 18 about 90 degrees. The inner and outer bodies 12, 14 are geared together so that they always rotate relative to each other at a fixed ratio as illustrated by gearing in gearbox 82 in FIGS. 1 and 4.

The inner body 12 rotates about the inner axis 16 with an inner body rotational speed 74 equal to its orbital speed 76 divided by the number of inner body lobes. The number of inner lobes are equal the number of blades. If the inner body 12 rotates in the same direction as its orbital direction, a 2 lobed outer body configuration is used. If the inner body 12 rotates in an opposite orbital direction, a 4 lobed outer body configuration is used. In a first embodiment the inner and outer bodies 12, 14 are both rotatable and the outer body 14 rotates about the outer axis 18 at 1.5 times the rotational speed that the inner body 12 rotates about the inner axis 16. The outer body 14 rotates at a speed equal to the rotational speed of the inner body 12 times the number of lobes on the inner body divided by the number of lobes on the outer body 14.

Figure 2:
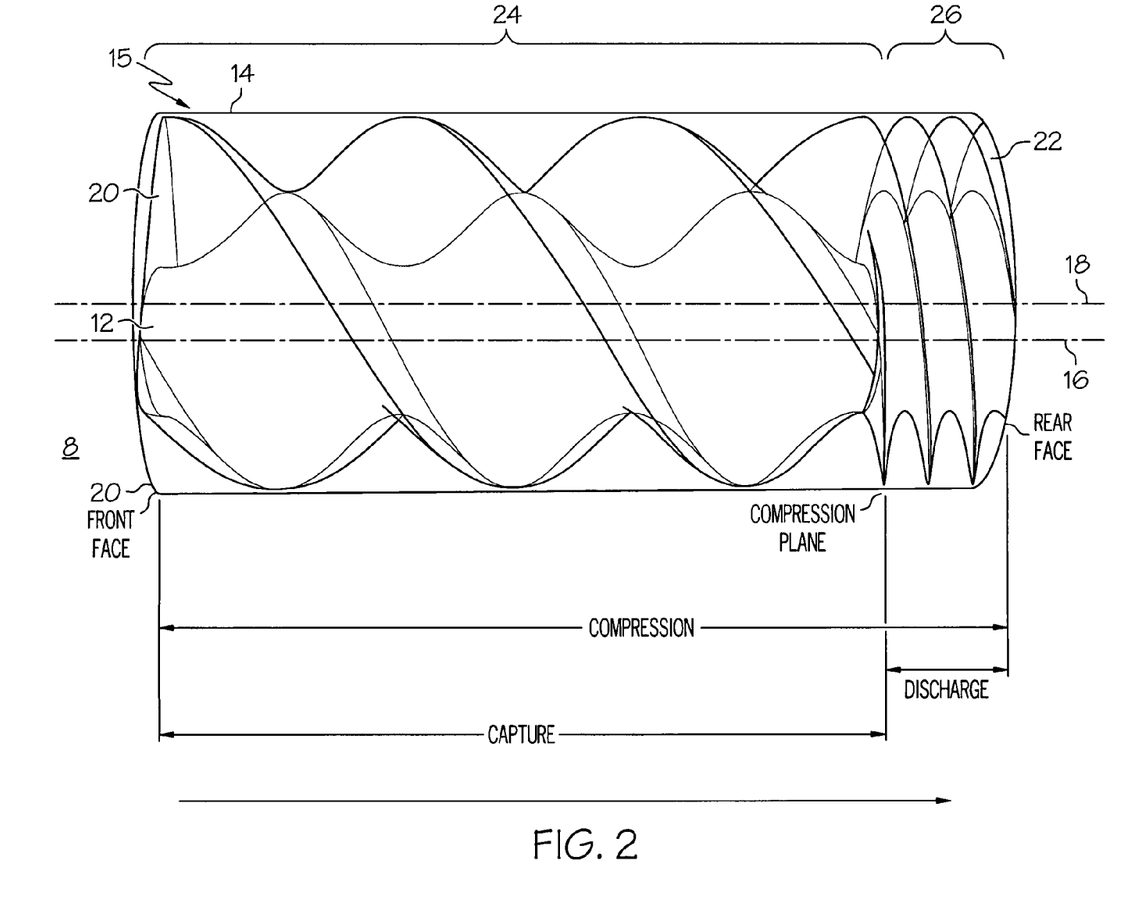
FIG. 2 is a diagrammatic cross-sectional view illustration of the compressor illustrated in FIG. 1.
Figure 3:
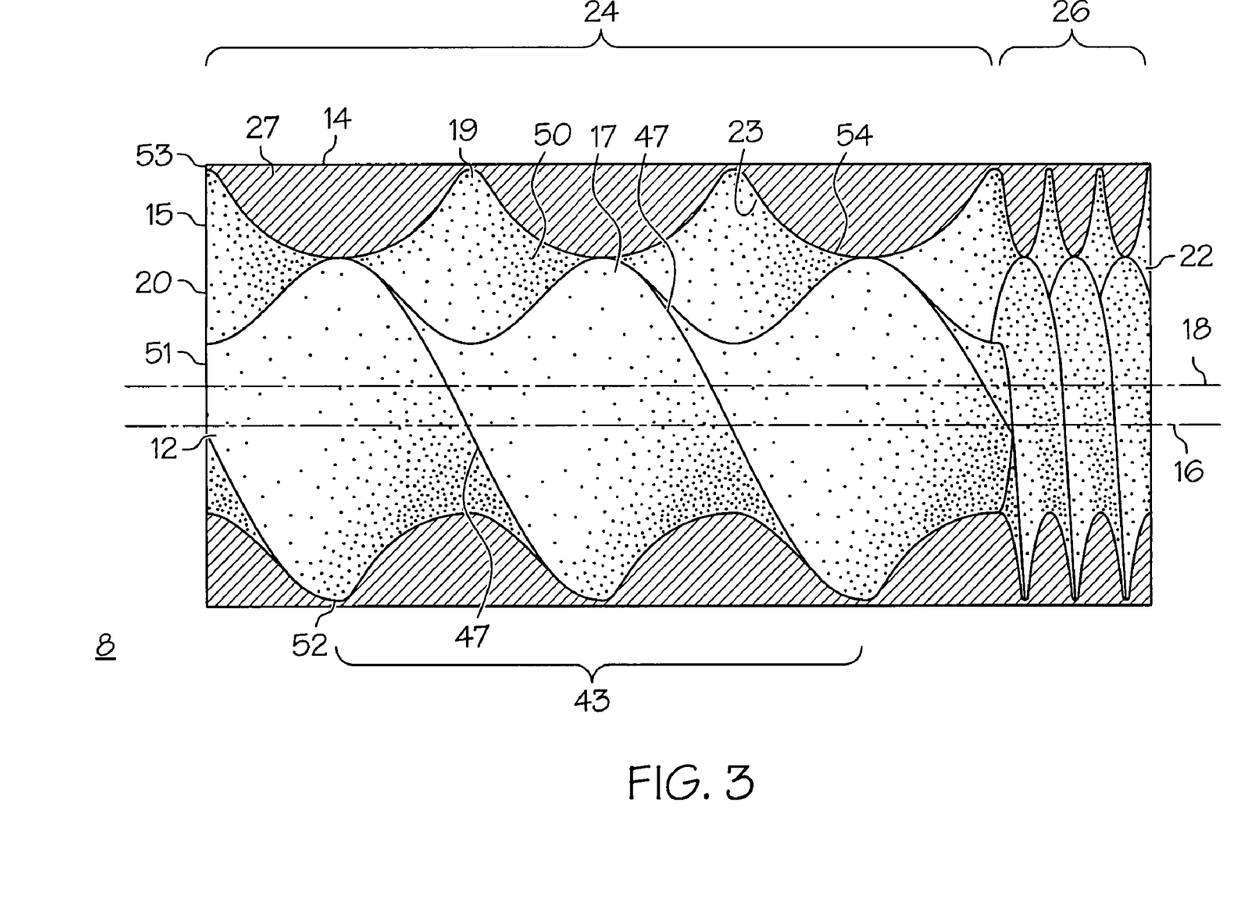
FIG. 3 is a diagrammatic partially cut-away perspective view illustration of helical blade portions of inner and outer bodies of the compressor illustrated in FIG. 2.
Figure 11:
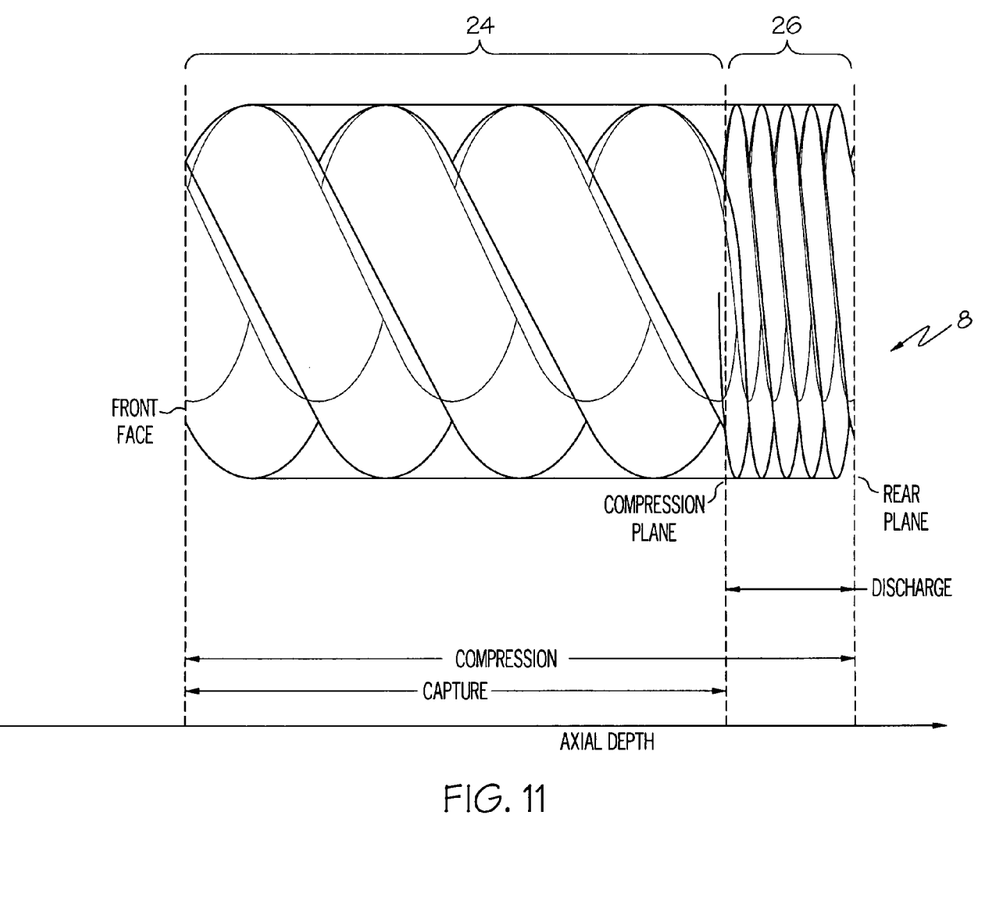
FIG. 11 is a diagrammatic cross-sectional view illustration of the positive displacement continuous axial flow compressor with the inner and outer bodies illustrated in FIG. 7.

The twist slopes of the outer body 14 are equal to the twist slopes of the inner body 12 times the number of inner body lobes N divided by the number of outer body lobes M. For the configuration illustrated in FIGS. 7-10 having three inner lobes or inner helical blades 17 and two outer lobes or outer helical blades 27, it takes 900 degrees of rotation of the outer body 14 and 600 degrees of rotation of the inner body 12 to mechanically capture one of the charges of gas 50. The inner body twist slope is substantially increased going from the first section 24 to the second section 26 at an axial location designated a compression plane as indicated in FIG. 2. A fairing section between the first and second sections may replace the compression plane if undesirable stress distributions are present. A further comparison between the configuration illustrated in FIGS. 7-10 having three inner lobes and two outer lobes to the configuration illustrated in FIG. 6 having two inner body lobes 60 and three outer body lobes 64 may be had by comparing FIG. 11 to FIG. 2. Note the number of turns and degrees of rotation of the outer body 14 and the number of turns and degrees of rotation of the inner body 12 needed to capture one of the charges of gas 50 between the upstream and downstream ends 52, 54 of the charge 50. Also note the difference in twist slopes of the first and second sections 24, 26.

The continuous axial flow positive displacement compressor, referred to herein as a worm compressor 8, may be used in a wide range of applications and provides high mass flow rate for a given frontal area, continuous near steady fluid flow, and reasonable efficiency over a wide range of operating conditions. It is light-weight and highly efficient and has far fewer parts as compared to other axial compressors which in turn reduces the costs of manufacturing, installing, refurbishing, overhauling, and replacing the compressor. The first embodiment provides a first mode of the compressor's operation disclosed herein in which the inner and outer bodies 12, 14 both rotate about the inner and outer axes 16, 18, respectively. The first mode avoids introducing a centrifugal rotor whirl effect on a support of the compressor and core engine. In a second embodiment the outer body 14 remains static and the inner body 12 simultaneously orbits the outer body's geometric center which is the outer axis 18 and spins about the instantaneous inner body's geometric center which is the inner axis 16. The second embodiment provides a second mode of the compressor's operation disclosed in which there is only a single rotor rotating potentially simplifying the mechanical design process.

The continuous axial flow positive displacement compressor, referred to herein as a worm compressor 8, may be used in a wide range of applications and provides reasonably high mass flow rate for a given frontal area, continuous near steady fluid flow, and is expected to provide reasonable efficiency over a wide range of operating conditions. Because the worm compressor operates in a positive displacement mode, it will provide compression levels that are nearly independent of rotor speed over a wide operating range. In thermal engines and other applications, this feature provides a distinct advantage over conventional axial flow compressors, for which compression ratios are directly related to rotor speed. Positive displacement operation also reduces or eliminates aerodynamic stall effects which allows the compressor to be run off-design at compression ratios well above a conventional stall line with the only ill effect being degradation of adiabatic efficiency. The worm compressor is expected to be light-weight, highly efficient, and have far fewer parts than conventional axial compressors which in turn reduces the costs of manufacturing, installing, refurbishing, overhauling, and replacing the compressor.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. An axial flow positive displacement compressor comprising:
   an inlet axially spaced apart and upstream from an outlet,
   a compressor assembly including an inner body disposed within an outer body and the inner and outer bodies extending from the inlet to the outlet,
   the inner and outer bodies having offset inner and outer axes respectively,
   at least one of the inner and outer bodies being rotatable about a corresponding one of the inner and outer axes,
   the inner and outer bodies having intermeshed inner and outer helical blades wound about the inner and outer axes respectively,
   the inner and outer helical blades extending radially outwardly and inwardly respectively,
   the inner helical blades extending radially outwardly from an inner hub of the inner body,
   the compressor assembly having first and second sections in serial downstream flow relationship extending between the inlet and the outlet,
   the inner and outer helical blades having first and second twist slopes in the first and second sections respectively, and
   the first twist slopes being less than the second twist slopes.

2. A compressor as claimed in claim 1 further comprising the helical blades in the first section having a sufficient number of turns to trap charges of gas in the first section during the compressor's operation.

3. A compressor as claimed in claim 2 further comprising the number of turns being sufficient to mechanically trap the charges of gas.

4. A compressor as claimed in claim 2 further comprising the number of turns being sufficient to dynamically trap the charges of gas.

5. A compressor as claimed in claim 1 further comprising the outer body being rotatable about the outer axis and the inner body and being rotatable about the inner axis.

6. A compressor as claimed in claim 5 further comprising the inner and outer bodies being geared together in a fixed gear ratio.

7. A compressor as claimed in claim 6 further comprising the helical blades in the first section having a sufficient number of turns to trap charges of gas in the first section during the compressor's operation.

8. A compressor as claimed in claim 7 further comprising the number of turns being sufficient to mechanically trap the charges of gas.

9. A compressor as claimed in claim 7 further comprising the number of turns being sufficient to dynamically trap the charges of gas.

10. A compressor as claimed in claim 1 further comprising the outer body being rotatably fixed about the outer axis and the inner body being orbital about the outer axis.

11. A compressor as claimed in claim 10 further comprising the helical blades in the first section having a sufficient number of turns to trap charges of gas in the first section during the compressor's operation.

12. A compressor as claimed in claim 11 further comprising the number of turns being sufficient to mechanically trap the charges of gas.

13. A compressor as claimed in claim 12 further comprising the number of turns being sufficient to dynamically trap the charges of gas.

14. A engine comprising:
in downstream serial flow relationship an axial flow positive displacement compressor, a combustor, and a high pressure turbine drivingly connected to the compressor by a high pressure shaft,
the compressor having an inlet axially spaced apart and upstream from an outlet,
a compressor assembly including an inner body disposed within an outer body and the inner and outer bodies extending from the inlet to the outlet,
the inner and outer bodies having offset inner and outer axes respectively,
at least one of the inner and outer bodies being rotatable about a corresponding one of the inner and outer axes,
the inner and outer bodies having intermeshed inner and outer helical blades wound about the inner and outer axes respectively,
the inner and outer helical blades extending radially outwardly and inwardly respectively,
the inner helical blades extending radially outwardly from an inner hub of the inner body,
the compressor assembly having first and second sections in serial downstream flow relationship extending between the inlet and the outlet,
the inner and outer helical blades having first and second twist slopes in the first and second sections respectively, and
the first twist slopes being less than the second twist slopes.

15. An engine as claimed in claim 14 further comprising the helical blades in the first section having a sufficient number of turns to trap charges of gas in the first section during the compressor's operation.

16. An engine as claimed in claim 15 further comprising the number of turns being sufficient to mechanically trap the charges of gas.

17. An engine as claimed in claim 15 further comprising the number of turns being sufficient to dynamically trap the charges of gas.

18. An engine as claimed in claim 14 further comprising the outer body being rotatable about the outer axis and the inner body and being rotatable about the inner axis.

19. An engine as claimed in claim 18 further comprising the inner and outer bodies being geared together in a fixed gear ratio.

20. An engine as claimed in claim 19 further comprising the helical blades in the first section having a sufficient number of turns to trap charges of gas in the first section during the compressor's operation.

21. An engine as claimed in claim 20 further comprising the number of turns being sufficient to mechanically trap the charges of gas.

22. An engine as claimed in claim 20 further comprising the number of turns being sufficient to dynamically trap the charges of gas.

23. An engine as claimed in claim 14 further comprising the outer body being rotatably fixed about the outer axis and the inner body being orbital about the outer axis.

24. An engine as claimed in claim 23 further comprising the helical blades in the first section having a sufficient number of turns to trap charges of gas in the first section during the compressor's operation.

25. An engine as claimed in claim 24 further comprising the number of turns being sufficient to mechanically trap the charges of gas.

26. An engine as claimed in claim 25 further comprising the number of turns being sufficient to dynamically trap the charges of gas.

27. A gas turbine engine comprising:
a gas generator connected in work producing relationship to a power consuming device,
a core engine including in downstream serial flow relationship an axial flow positive displacement compressor, a combustor, and a high pressure turbine drivingly connected to the compressor by a high pressure shaft,
the compressor having an inlet axially spaced apart and upstream from an outlet,
a compressor assembly including an inner body disposed within an outer body and the inner and outer bodies extending from the inlet to the outlet,
the inner and outer bodies having offset inner and outer axes respectively,
at least one of the inner and outer bodies being rotatable about a corresponding one of the inner and outer axes,
the inner and outer bodies having intermeshed inner and outer helical blades wound about the inner and outer axes respectively,
the inner and outer helical blades extending radially outwardly and inwardly respectively,
the inner helical blades extending radially outwardly from an inner hub of the inner body,
the compressor assembly having first and second sections in serial downstream flow relationship extending between the inlet and the outlet,
the inner and outer helical blades having first and second twist slopes in the first and second sections respectively, and
the first twist slopes being less than the second twist slopes.

28. An engine as claimed in claim 27 further comprising the helical blades in the first section having a sufficient number of turns to trap charges of gas in the first section during the compressor's operation.

29. An engine as claimed in claim 28 further comprising the number of turns being sufficient to mechanically trap the charges of gas.

30. An engine as claimed in claim 28 further comprising the number of turns being sufficient to dynamically trap the charges of gas.

31. An engine as claimed in claim 27 further comprising the outer body being rotatable about the outer axis and the inner body and being rotatable about the inner axis.

32. An engine as claimed in claim 31 further comprising the inner and outer bodies being geared together in a fixed gear ratio.

33. An engine as claimed in claim 32 further comprising the helical blades in the first section having a sufficient number of turns to trap charges of gas in the first section during the compressor's operation.

34. An engine as claimed in claim 33 further comprising the number of turns being sufficient to mechanically trap the charges of gas.

35. An engine as claimed in claim 33 further comprising the number of turns being sufficient to dynamically trap the charges of gas.

36. An engine as claimed in claim 27 further comprising the outer body being rotatably fixed about the outer axis and the inner body being orbital about the outer axis.

37. An engine as claimed in claim 36 further comprising the helical blades in the first section having a sufficient number of turns to trap charges of gas in the first section during the compressor's operation.

38. An engine as claimed in claim 37 further comprising the number of turns being sufficient to mechanically trap the charges of gas.

39. An engine as claimed in claim 38 further comprising the number of turns being sufficient to dynamically trap the charges of gas.

40. An aircraft gas turbine engine comprising:
a fan section and a core engine including a gas generator downstream of the fan section,
a low pressure turbine having at least one row of turbine rotor blades downstream of the gas generator,
the low pressure turbine drivingly attached to at least one row of circumferentially spaced apart fan rotor blades in the fan section by a low pressure shaft,
the core engine including in downstream serial flow relationship an axial flow positive displacement compressor, a combustor, and a high pressure turbine drivingly connected to the compressor by a high pressure shaft,
the compressor having an inlet axially spaced apart and upstream from an outlet,
a compressor assembly including an inner body disposed within an outer body and the inner and outer bodies extending from the inlet to the outlet,
the inner and outer bodies having offset inner and outer axes respectively,
at least one of the inner and outer bodies being rotatable about a corresponding one of the inner and outer axes,
the inner and outer bodies having intermeshed inner and outer helical blades wound about the inner and outer axes respectively,
the inner and outer helical blades extending radially outwardly and inwardly respectively,
the inner helical blades extending radially outwardly from an inner hub of the inner body,
the compressor assembly having first and second sections in serial downstream flow relationship extending between the inlet and the outlet,
the inner and outer helical blades having first and second twist slopes in the first and second sections respectively, and
the first twist slopes being less than the second twist slopes.

41. An engine as claimed in claim 40 further comprising the helical blades in the first section having a sufficient number of turns to trap charges of gas in the first section during the compressor's operation.

42. An engine as claimed in claim 41 further comprising the number of turns being sufficient to mechanically trap the charges of gas.

43. An engine as claimed in claim 41 further comprising the number of turns being sufficient to dynamically trap the charges of gas.

44. An engine as claimed in claim 40 further comprising the inner and outer bodies being geared together in a fixed gear ratio.

45. An engine as claimed in claim 44 further comprising the outer body being rotatable about the outer axis and the inner body and being rotatable about the inner axis.

46. An engine as claimed in claim 45 further comprising the helical blades in the first section having a sufficient number of turns to trap charges of gas in the first section during the compressor's operation.

47. An engine as claimed in claim 46 further comprising the number of turns being sufficient to mechanically trap the charges of gas.

48. An engine as claimed in claim 44 further comprising the outer body being rotatably fixed about the outer axis and the inner body being orbital about the outer axis.

49. An engine as claimed in claim 48 further comprising the helical blades in the first section having a sufficient number of turns to trap charges of gas in the first section during the compressor's operation.

50. An engine as claimed in claim 49 further comprising the number of turns being sufficient to mechanically trap the charges of gas.

51. An engine as claimed in claim 49 further comprising the number of turns being sufficient to dynamically trap the charges of gas.

* * * * *